United States Patent [19]

Petkovic et al.

[11] Patent Number: 5,793,358

[45] Date of Patent: Aug. 11, 1998

[54] METHOD AND MEANS FOR MANAGING A LUMINESCENT LAPTOP KEYBOARD

[75] Inventors: Dragutin Petkovic, Los Gatos; Edwin Joseph Selker, Palo Alto, both of Calif.

[73] Assignee: International Business Machines Corporation, Armonk, N.Y.

[21] Appl. No.: 782,186

[22] Filed: Jan. 14, 1997

[51] Int. Cl.⁶ .................................................. G09G 5/00
[52] U.S. Cl. ............................. 345/168; 345/170; 362/84; 362/287; 341/22
[58] Field of Search ................................ 345/168, 170; 362/84, 287; 341/22

[56] References Cited

U.S. PATENT DOCUMENTS

| 4,449,024 | 5/1984 | Stracener | 200/317 |
| 4,882,581 | 11/1989 | Inobe | 341/22 |
| 5,073,843 | 12/1991 | Magee | 362/84 |
| 5,684,513 | 11/1997 | Decker | 345/168 |

*Primary Examiner*—Steven J. Saras
*Assistant Examiner*—Seth D. Vail
*Attorney, Agent, or Firm*—James C. Pintner

[57] ABSTRACT

A method and means for flash charging a plurality of phosphorescent-coated, touch-sensitive keys using a planar, light-transmissive multicolor liquid crystal display (LCD) where the tripping event is the position of a lid of the notebook within a critical angle of the base.

9 Claims, 2 Drawing Sheets

METHOD AND MEANS FOR MANAGING A LUMINESCENT LAPTOP KEYBOARD

FIELD OF THE INVENTION

This invention relates to enhancing the use of key-actuated information handling systems and, more particularly, to enhancing the use of portable self-powered, key-actuated systems in dark or low-level ambient light environments.

DESCRIPTION OF RELATED ART

Liquid Crystal Displays and Laptops

A liquid crystal display (LCD) is an information display comprising a picture element (pixel) addressable array. This pixel-addressable array is formed from a thin layered sandwich of glass plates, polarizing filters, transparent electrodes, and liquid crystal material. The variety of electro-optical effects associated with LCs permit LCDs to be fashioned into many different types of information displays. Because of the LCD's thin sandwich construction, the bulk associated with electron beam tube displays can be eliminated. Furthermore, many LCDs are reflective, meaning they use only ambient light to illuminate the display. Even where LCDs do require an external light source, they consume much less power than electron beam devices.

A "laptop" is defined as a microcomputer small enough to use on one's lap. Laptops are also referenced as "notebook" computers and will be used synonymously through the specification. The term "notebook" derives from the fact that laptop computers may be closed and carried, much like a closed book when not in use. Also, they may be opened up, as is a book, when being read. When so opened, the display occupies the top lid or cover portion and is approximately vertical and hinged to the bottom lid or cover portion. Relatedly, the latter contains information entry and processing facilities, and is electrically and logically coupled to the LCD. Laptops may be plugged into an electrical outlet or more conveniently powered by internal battery for several hours.

Aspects of Luminescence and Phosphorescence

It is well appreciated that "luminescence" is the emission of light by means other than combustion and therefore occurring at lower temperatures than are required for combustion. An example of luminescence is the light, or glow, emitted by a luminous watch dial. Luminescence contrasts with "incandescence", which is the production of light by heated materials.

It is also appreciated that when certain materials absorb various kinds of energy, some of the energy may be emitted as light in a process wherein (1) the incidental energy causes the electrons of the atoms of the absorbing material to become excited and jump from the inner orbits of the atoms to the outer orbits; (2) when the electrons fall back to their original state, a photon of light is emitted; and (3) the interval between the two steps may be short (less than $1/100,000$ of a second) or long (many hours).

It is further well appreciated that if the interval is short between energy absorption and emission as light, then the process is called "fluorescence". However, if the interval is long, the process is called "phosphorescence". In either case, the light produced is almost always of lesser energy, that is, of longer wavelength, than the exciting light. Restated, "phosphorescence" is the persistent emission of light following exposure and removal of incident radiation.

Laptops and Illuminated Keys

In the prior art, key-based information handling systems were used in darkened or low ambient light environments. The Magee and Subbaroa patents take different approaches in enhancing key visibility.

Magee, U.S. Pat. No. 5,073,843, "Phosphorescent Key Pad", issued Dec. 17, 1991, disclosed a keypad illumination kit comprising a plurality of pads with adhesive backing on one side and phosphorescent information indicia on the other side. These pads were to be used for selective application to key tops on a keyboard or like data entry device for use in low or nonexistent ambient light conditions. The thickness of the material was sufficient to provide a desired amount of "phosphorescent excitation" for a desired length of time based upon a probable light exposure during those periods of illumination which are expected to charge the phosphors. This would avoid any need for an external light source as apparently required by art prior thereto.

Stracener, U.S. Pat. No. 4,449,024, "Backlighted Illuminated Keyboard", issued May 15, 1984, disclosed the use of an easily replaced single-point source of light diffused through a clear plastic diffuser and a translucent overlay defining a matrix of keys backed by actuable pins and electronic registration means. In the context of a battery-powered portable, such backlighting poses an unacceptable power drain.

SUMMARY OF THE INVENTION

It is accordingly an object of this invention to devise a method and means for improving the dark or low ambient light visibility of actuable keys in portable self-powered, key-based information handling systems as exemplified by a laptop or notebook computer.

It is a related object that such method and means use minimal power and rely upon as many of the facilities inherent in standard laptop or notebook computer configurations as possible.

The above objects are believed satisfied by a method and means for flash charging a plurality of phosphorescent-coated, touch-sensitive keys using a planar, light-transmissive multicolor liquid crystal display (LCD) where the position of a lid of the notebook within a critical angle of the base is the tripping event. In a notebook computer, the keys are operable as an information entry means residing within a base. A processor, also residing within the base, electrically and logically operates the LCD, the LCD being set within the lid and rotationally coupling the base.

More particularly, the flash-charging method comprises the steps of (a) rotating the lid such that the LCD lies within an acute dihedral angle x opposing the plurality of keys set within the base in the range 0<x<A degrees, where A is a predetermined value; and (b) causing the LCD responsive to the rotation of the lid as in step (a) to display and project a colored light within an appropriate spectral-charging region upon the phosphorescent-coated keys for a predetermined period of time. Optimally, the range of angles lies between zero and 15 degrees. Also, the invention contemplates that the lid will initiate activation of the LCD whether it is rotated from a position of closure with and away from the base but within the critical angle, or rotated from a position greater than the critical angle toward the base so as to lie within the critical angle.

DESCRIPTION OF THE PREFERRED EMBODIMENT

A Laptop and Its Geometry

Figure 1:
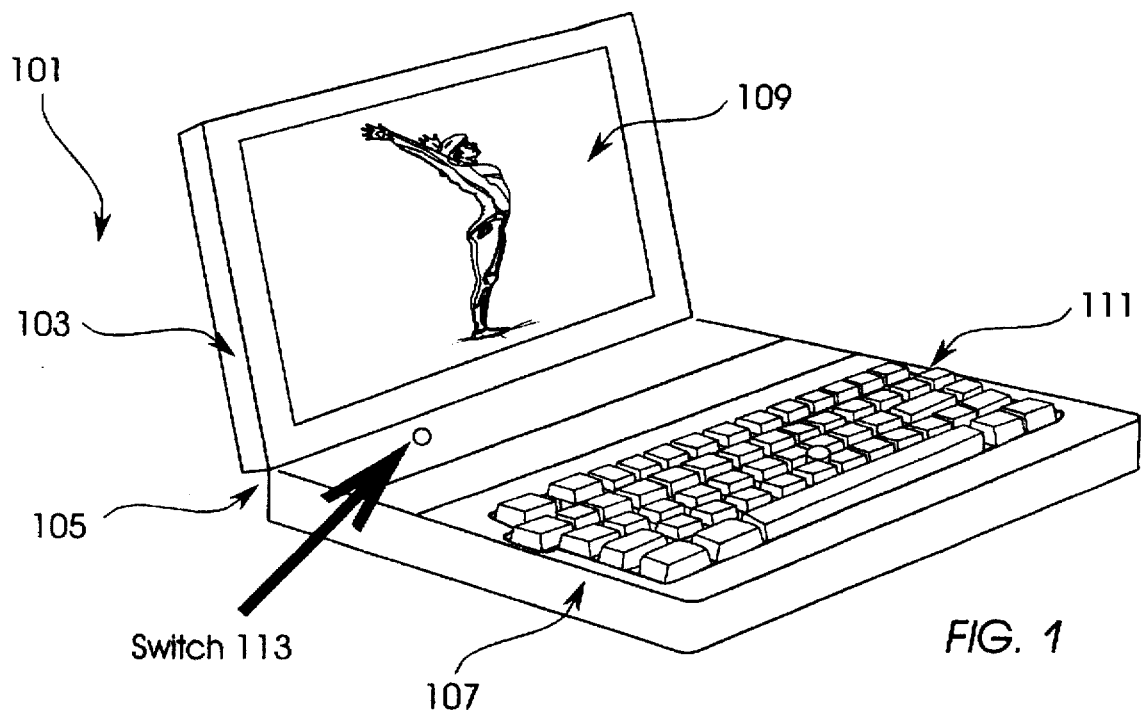
FIG. 1 depicts a laptop or notebook computer in an operationally open position with a substantially obtuse dihedral angle between the lid and the base.

Referring now to FIG. 1, there is depicted a laptop or notebook computer 101 in an operationally open position with a substantially obtuse dihedral angle between the lid 103 and the base 107. The computer as shown is of an IBM ThinkPad 755 CV type. A planar, light-transmissive, multi-color liquid crystal display (LCD) 109 is set within the lid 103 and rotationally couples the base 107 through a hinged connection 105. A full 88-key matrix board 111 is secured to base 107 also through hinged coupling 105 and a pair of spring-loaded latches (not shown). A spring-loaded pin switch 113 positioned on the base 107 near the hinged coupling 105 operates to interrupt or cut off power to the LCD. Such a pin switch is preferably modified through additional AND/OR latches to set an interrupt and branch to a display driver when the lid 103 approaches within a small acute dihedral angle of the base 107. Parenthetically, when the lid is in a closed position, i.e., the acute dihedral angle is zero degree power, the LCD is turned off and remains off until the lid is opened and rotated.

Preparation of Keyboard

In the preferred embodiment, the keys may be prepared in one of a variety of ways. For instance, information indicia on the key may be painted or stenciled on the top surface of each with a phosphorescent paint. Usable phosphorescent materials are manufactured by Shannon Luminous Materials, Inc., of Santa Ana, Calif. A clear enamel may then overlay the phosphor coating to provide a hard, wear-resistant, and chip-proof stroke surface for each key top. Alternatively, each key may be overlayed with a key pad with an adhesive backing on one side and phosphorescent indicia on the other in the manner described in Magee, U.S. Pat. No. 5,073,843.

Alternatively, the keys may be molded from plastic impregnated with phosphorescent material.

Charging of the Keys Independent of the Information State of the Laptop

Although ambient light from time to time may be used to recharge phosphorescent materials in the context of this invention, such occurrence of such is problematic. This is especially the case where the laptop or notebook is to be used under dark or low ambient light conditions.

While commercial-grade phosphorescent paints will glow in the dark for several hours after charging, it was unexpectedly discovered that the backlighting and projection of white light for a brief period, say 30 seconds, was sufficient provided that the LCD was within 15 degrees of a phosphorescent painted or coated keyboard.

Figure 2:
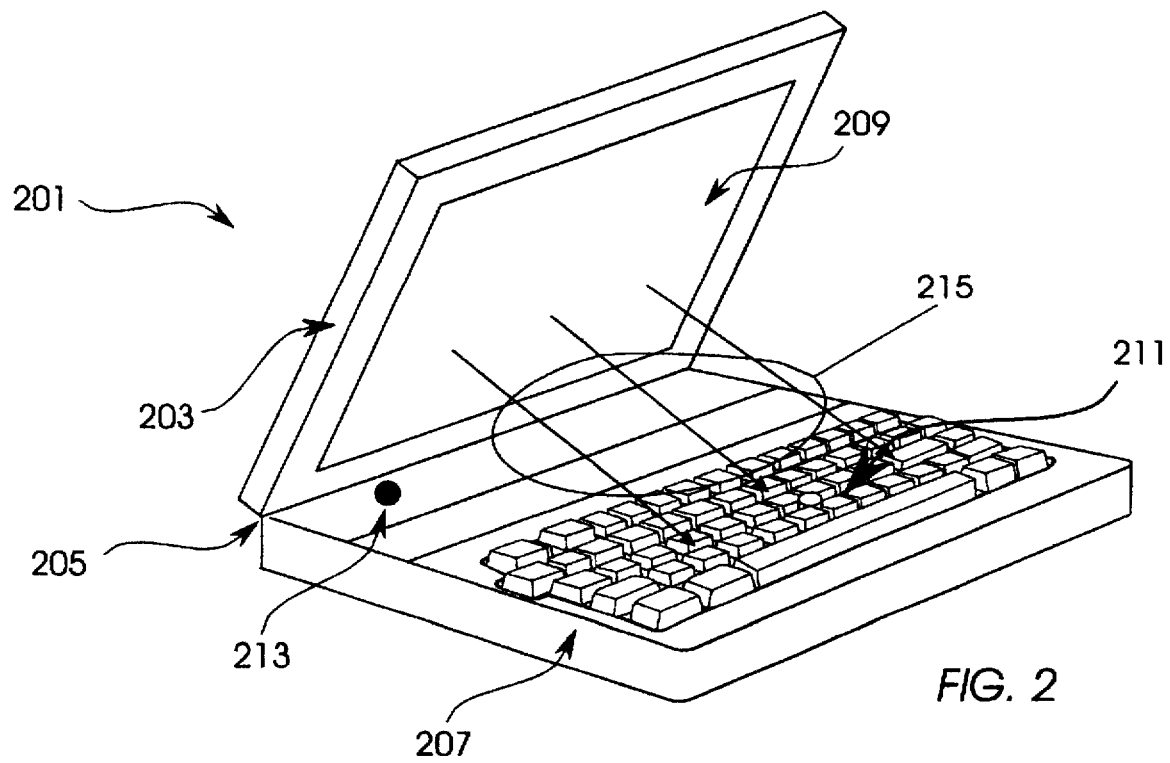
FIG. 2 shows a laptop or notebook computer in an operationally open position with a substantially acute dihedral angle between the lid and the base such that the base is illuminated by an LCD screen within the lid.

Referring now to FIG. 2, there is shown the laptop of FIG. 1 with some modification. More particularly, it has been found desirable to charge or recharge the keys 211 (a) where the laptop lid 203 is first opened up; (b) where, during operation, a user initiates the operation by keystroke action; and (c) where, during operation, the user positions the lid 203 to within a critical angle (15 degrees) of the base 207. Significantly, the charging operation should preferably occur when the information state of the laptop can be placed in suspension or hibernation during the charging period. This still requires that the LCD screen 209 be activated and that the phosphorescent coating be bathed in its radiation 215 during this period.

Initiation of LCD Flash Charging of Phosphorescent Keys

In the prior art, when the laptop is first opened, the system is in a powered-down state. Upon activation of an ON/OFF switch (not shown), a prestored microcode startup routine called BIOS is invoked and processed. BIOS is in the nature of a bootstrap routine responsible for initiating the basic logical configuration and processing of a personal or laptop/notebook system.

The position of switch 213 is used so as to enable flash charging of the keys 211 by the LCD 209. That is, when lid 201 is fully closed on base 207, then the switch is fully pressed into the base. However, when the lid is first opened and the lid is rotated away from the base, or when the laptop is operational and the user rotates the lid toward the base, the position of switch 213 also changes. There are several routine electromechanical and photoelectric configurations for sensing the switch position. These configurations also distinguish between a lid being placed in a stabilized position and merely being opened or closed outside of the critical range of dihedral angles, namely 0<angle<15 degrees. The position of the lid in the critical region changes the switch position. This is in turn sensed and enables a hardware interrupt.

The use of the stable positioning of lid 203 and switch 213 as the event invoking the flash charging of the keys obviates the need for alternatives, such as the use of key-driven monitors. However, it is included for purposes of completeness. In this regard, a "monitor" is a software operating system construct that constantly polls for the occurrence of a specific type of condition. If a user were to type in a reserved word such as "PHOSPHOR" and depress a designated function key, then a monitor polling for this event would then branch to an appropriate software flash-charging driver.

Flow of Control

Figure 3:
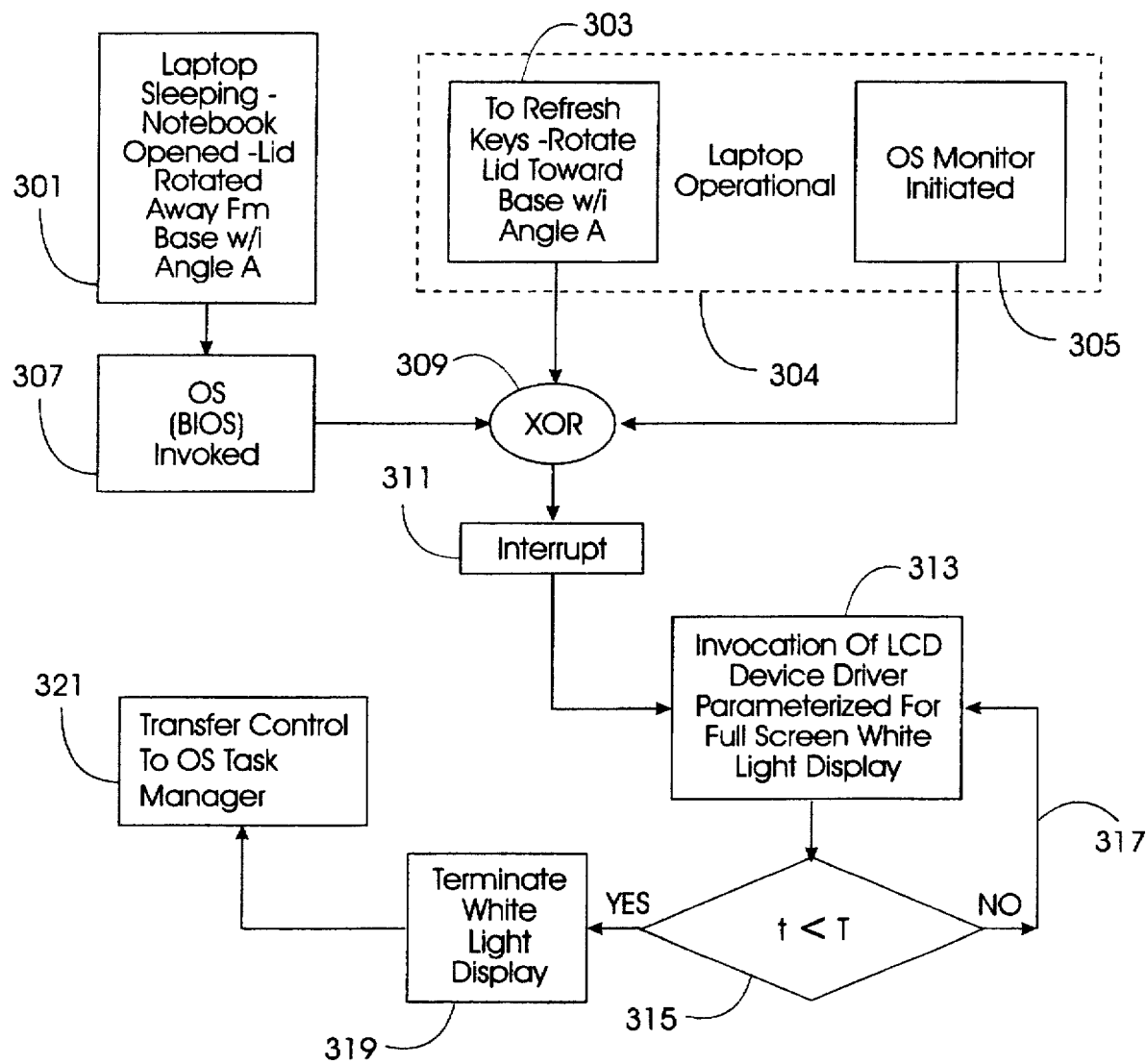
FIG. 3 sets forth a flow of control of the method and means of this invention.

Referring now to FIG. 3, there is shown a flow of control of the method and means of this invention. Three related modes are shown for invoking the method for flash charging the phosphorescent keys on an event rather than on a time-driven basis. The precipitating events include opening the notebook 301 when it is sleeping and two modes 304 when the notebook is operational. The latter include rotating the lid 203 toward the base 207 to lie within the critical angle, or using an OS monitor to poll for a special keyed data pattern 305. In order to avoid driving the system into an accidental state of ambiguity, the modes are processed "mutually exclusively" at step 309. By assuring that the priority of the events are the highest, then the flash charging can proceed with minimal or no interference with application or other task processing.

The flash charging refers to the generation of a white or other appropriately colored display on the LCD 209 and the illumination 215 onto the key tops for a defined time. The method of this invention contemplates use of the existing software LCD display driver 313 parameterized with the appropriate color values. The display is applied to the LCD for a duration as measured by decision timing loops 315 and 317 referencing the system clock or the like. At the point where the time expires, control is transferred to the task control manager 321 over path 319.

The flow of control shown in FIG. 3 can be expressed in any one of a number of procedural languages such as PASCAL, C, ASSEMBLER, etc. consistent with a laptop operating system such as Windows 95, MSDOS, PCDOS, OS2, etc. Since the flow invokes a preexisting device driver (LCD driver), it compiles out into a compact object code and executes efficiently.

The use of a software monitor as a source initiating the LCD flash charging of the phosphorescent-coated keys is optional and is included for purposes of completeness. As may be recalled, a monitor is a construct for allocating shared serially-reusable resources. In the context of this invention, any event could be defined as a monitor call provided that it sets an interrupt. One common event is that of a keyboard call. This is usually initiated by entry of a reserved word+function key and would have priority access to invoke the function through the monitor.

These and other extensions of the invention may be made without departing from the spirit and scope thereof as recited in the appended claims.

What is claimed is:

1. A method for flash charging a plurality of phosphorescent-coated, touch-sensitive keys (211) operable as an information entry means of a notebook-type computer (201) residing within a base (207), said computer further including processing means also residing within said base for electrically and logically operating a planar, light-transmissive multicolor liquid crystal display (LCD), said LCD (209) being set within a lid (203) and rotationally coupling (205) the base, comprising the steps of:

(a) rotating the lid such that the LCD lies within an acute dihedral angle x opposing the plurality of keys set within the base in the range 0<x<A degrees, where A is a predetermined value; and (b) causing the LCD responsive to the rotation of the lid as in step (a) to display and project a colored light (215) within an appropriate spectral-charging region upon the phosphorescent-coated keys for a predetermined period of time.

2. The method according to claim 1, wherein the range of angles lies between zero and 15 degrees.

3. The method according to claim 1, wherein the step of rotating the lid includes the step selected from a set consisting of rotating the lid from a position of closure with and away from the base but within the critical angle, and rotating the lid from a position greater than the critical angle toward the base so as to lie within the critical angle.

4. The method according to claim 1, wherein the step of causing the LCD to display and project colored light includes the step of causing the LCD to display and project substantially white (polychromatic) light.

5. In a computer of the notebook type including a planar, light-transmissive multicolor liquid crystal display (LCD) set within a lid and rotationally coupling a base, and information entry and processing means residing within said base for electrically and logically operating said LCD, said information entry means forming a matrix of actuable touch-sensitive keys or the like and coated with phosphorescent information indicia on counterpart ones of the keys, the combination comprising:

first means responsive to positioning the lid to lie within a predetermined acute dihedral angle formed by the lid and the base for causing said LCD to illuminate said phosphorescent information indicia for a predetermined time interval and for signaling completion of such process; and second means responsive to the completion of such process for engaging the processing means for causing the computer to transition to a prior or default information state.

6. The combination according to claim 5, wherein the first means include means responsive to rotation of said lid from a closed position to within the predetermined acute dihedral angle when the computer is initially powered on and rotation from a position greater than the critical angle to a position within said critical angle.

7. The combination according to claim 5, wherein the first means include monitor means responsive to any execution of a predetermined pattern of keystrokes when the computer is in a powered on and computational processing state.

8. The combination according to any one of the claims 6 through 7, wherein the acute dihedral angle lies in a range greater than zero degrees and less than 15 degrees.

9. The combination according to claim 5, wherein said coating phosphoresces within a predetermined spectral range after exposure to LCD-generated white light.

* * * * *